C. M. LUFKIN.
Machine for Digging Stones, Stumps, Roots, &c.

No. 161,047.            Patented March 23, 1875.

WITNESSES:
George Davis
F. J. Burge

INVENTOR:
Charles M Lufkin

UNITED STATES PATENT OFFICE.

CHARLES M. LUFKIN, OF LANGDON, NEW HAMPSHIRE.

IMPROVEMENT IN MACHINES FOR DIGGING STONES, STUMPS, ROOTS, &c.

Specification forming part of Letters Patent No. 161,047, dated March 23, 1875; application filed February 24, 1873.

*To all whom it may concern:*

Figure 1:
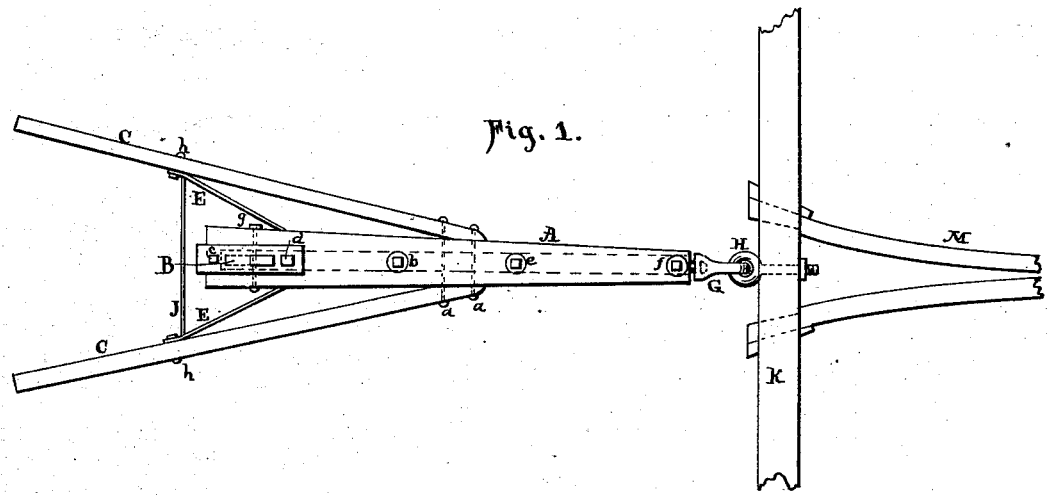
Figure 2:
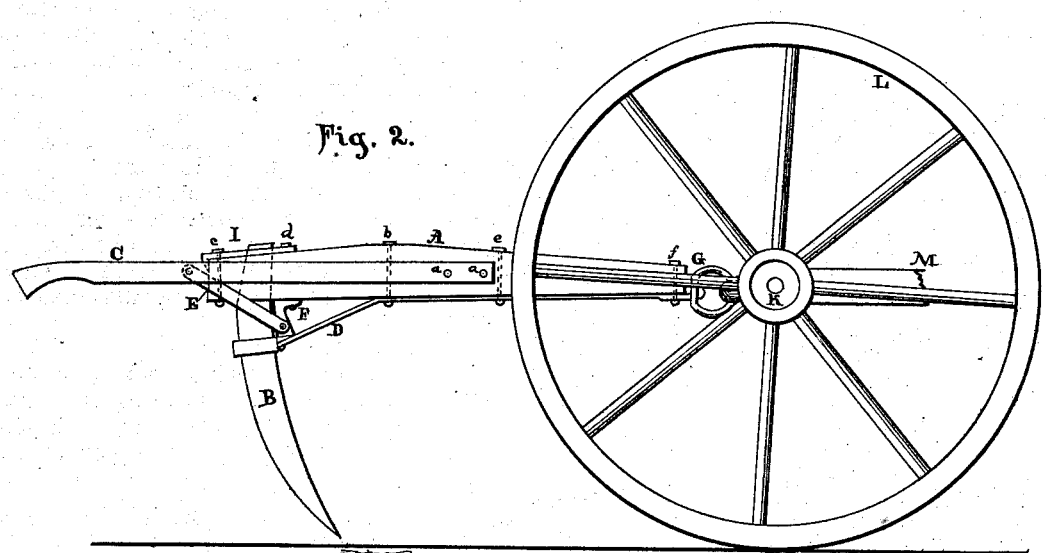

Be it known that I, CHARLES M. LUFKIN, of Langdon, in the county of Sullivan and State of New Hampshire, have invented certain Improvements in Machines for Digging Stones, Stumps, Roots, and Bushes, of which the following is a specification:

Figure 1 is a top view of a machine embodying my invention. Fig. 2 is a side view of the same.

The machine should be substantially constructed to resist the draft of the team in its operation. L represents the wheels, K the axle, and M the tongue or pole, of a common cart, to which the machine is attached with an eyebolt or hook, H, which passes through the axle; or the same result may be accomplished by means of a chain passed around the axle. A is the beam of the machine, to which is attached a hook or prong, B, passing through the hinder end of the beam, and secured with a bolt, $g$, and so set as to be on, or nearly on, the periphery of a circle, whose center is near the swivel G. D is the draw-iron, through which the hook or prong B passes, and is firmly secured to the beam by bolts $b\ e\ f$. G is a swivel attached to the draw-iron D, so as to allow a free and easy movement of the machine. F is a brace, which is locked into the draw-iron D, and holds it in position, being bolted at the upper end to the beam with a bolt, $d$. I is a stay-iron, which holds the upper end of the prong B securely in its place, being locked over the end of the beam to prevent a forward movement, and secured to the beam by bolts $c\ d$. C C are the handles by which the machine is operated, and are attached to the beam by bolts $a\ a$, and connected together by a rod, J, and to the brace F by braces E E, which support the handles, and prevent the liability of breaking by allowing them to spring when coming in contact with obstructions, to which they are liable when used.

The operation of the machine is as follows, viz: As the wheels are drawn along the operator carries the machine by the handles C C, and when the machine is drawn over any object to be removed the operator raises the machine to a suitable height, and with a quick downward force thrusts the prong into the ground under the object to be removed, and as the wheels are drawn along the power of the team is applied in such a manner as to produce a lifting and rolling draft, by which it is easily and quickly removed. It also may be used without the wheels in a similar manner where the nature of the obstructions is such as to render their use inconvenient, being drawn simply with a chain attached to the swivel G.

I claim as my invention—

The combination of the hook or prong B, draw-iron D, swivel G, beam A, stay-iron I, handles C C, rod J, braces E E, and brace F, substantially as and for the purpose hereinbefore set forth.

CHARLES M. LUFKIN.

Witnesses:
GEORGE DAVIS,
F. J. BURGE.